(12) United States Patent
Ciecko

(10) Patent No.: US 10,034,142 B1
(45) Date of Patent: Jul. 24, 2018

(54) MEDIA CONTENT DELIVERY SYSTEM AND METHOD

(71) Applicant: Brendan Ciecko, Boston, MA (US)

(72) Inventor: Brendan Ciecko, Boston, MA (US)

(73) Assignee: CUSEUM, Boston, MA (US)

( * ) Notice: Subject to any disclaimer, the term of this patent is extended or adjusted under 35 U.S.C. 154(b) by 0 days.

(21) Appl. No.: 15/960,057

(22) Filed: Apr. 23, 2018

Related U.S. Application Data

(63) Continuation of application No. 15/048,543, filed on Feb. 19, 2016.

(51) Int. Cl.
*H04W 4/029* (2018.01)
*H04W 4/02* (2018.01)
*H04W 4/021* (2018.01)
*H04W 4/024* (2018.01)
*B23K 9/00* (2006.01)

(52) U.S. Cl.
CPC .............. *H04W 4/029* (2018.02); *H04W 4/02* (2013.01); *H04W 4/021* (2013.01); *H04W 4/024* (2018.02); *B23K 9/0008* (2013.01)

(58) Field of Classification Search
CPC ....... H04W 4/02; H04W 4/029; H04W 4/021; H04W 4/024
See application file for complete search history.

(56) References Cited

U.S. PATENT DOCUMENTS

2016/0248704 A1* 8/2016 Soelberg ............. H04L 49/9005

* cited by examiner

*Primary Examiner* — Marcos Torres
(74) *Attorney, Agent, or Firm* — Robert Schuler

(57) ABSTRACT

One or more wireless networks operate to provide wireless connectivity to a network server that runs an application that operates to deliver content in the form of a location defined file to a mobile communication device that is either moving around a building interior or moving around in the open air. The mobile communication device has functionality that determines is rate of motion and functionality that allows it to determine its geographic location. The rate of motion and the geographic location can be sent to the application running on the network server and used to determine what type of content is appropriate to deliver and to and display on the mobile communication device.

11 Claims, 13 Drawing Sheets

FIG.9

CONTENT INSTANCE - LONG FORMAT

CONTENT INSTANCE ID: 100

ARTIST NAME: Rembrant van Rijn

TITLE: The Night Watch

ID OF COLLECTION: Rijksmuseum

IMAGE: [Still Image]

DESCRIPTION: Militia Company of District II under the Command of Captain Frans Banninck Cocq, also known as The Shooting Company of Frans Banning Cocq and Willem van Ruytenburch, but commonly referred to as The Night Watch, is a 1642 painting by Rembrandt van Rijn.

LOCATION: Gallery A, LOCATION.123

DATE OF CREATION: 1642

DIMENSIONS:

PERIODS AND STYLES: Dutch Golden Age

GEOLOCATION: BEACON B.50

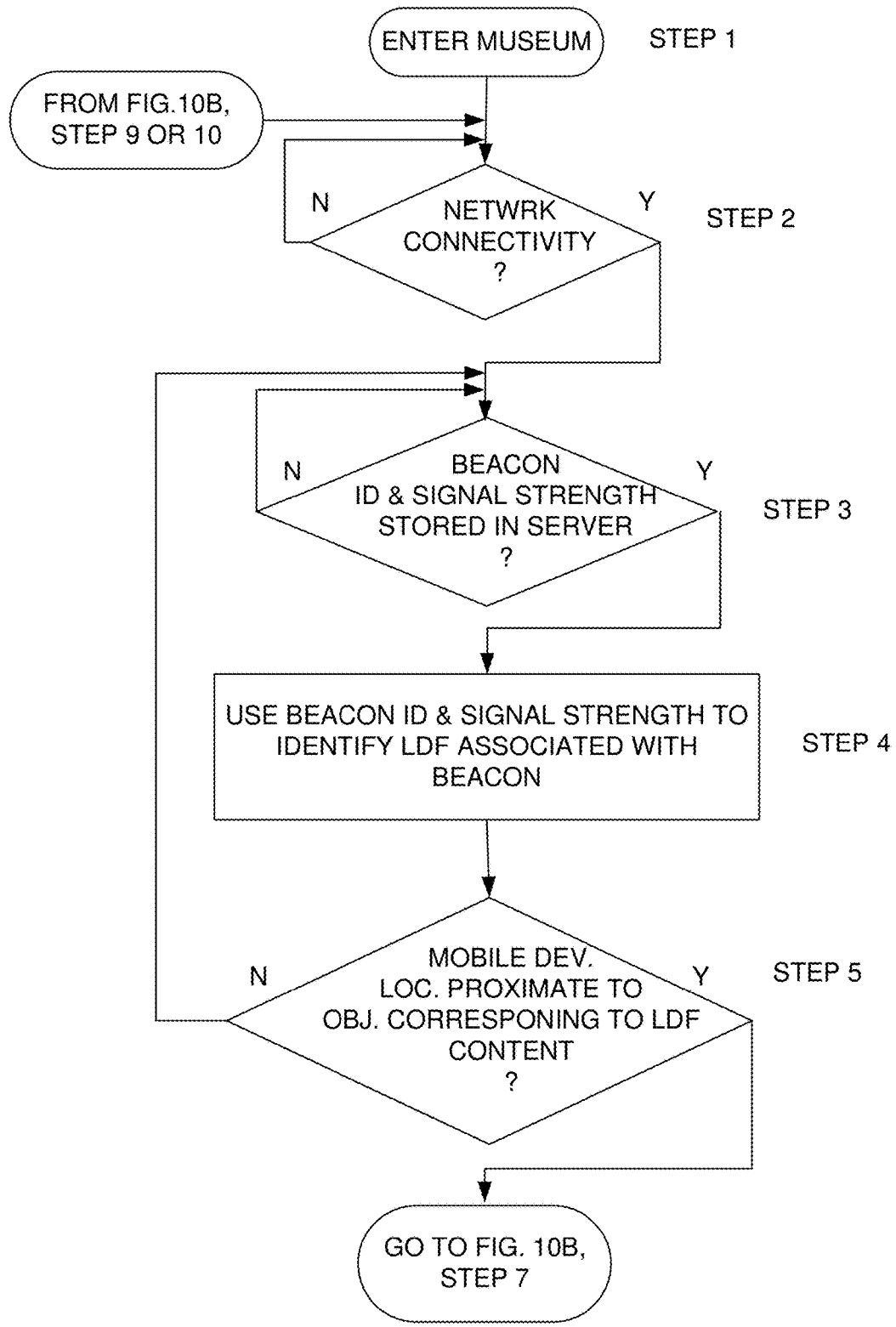
FIG.10A   LDF DELIVERY LOGIC

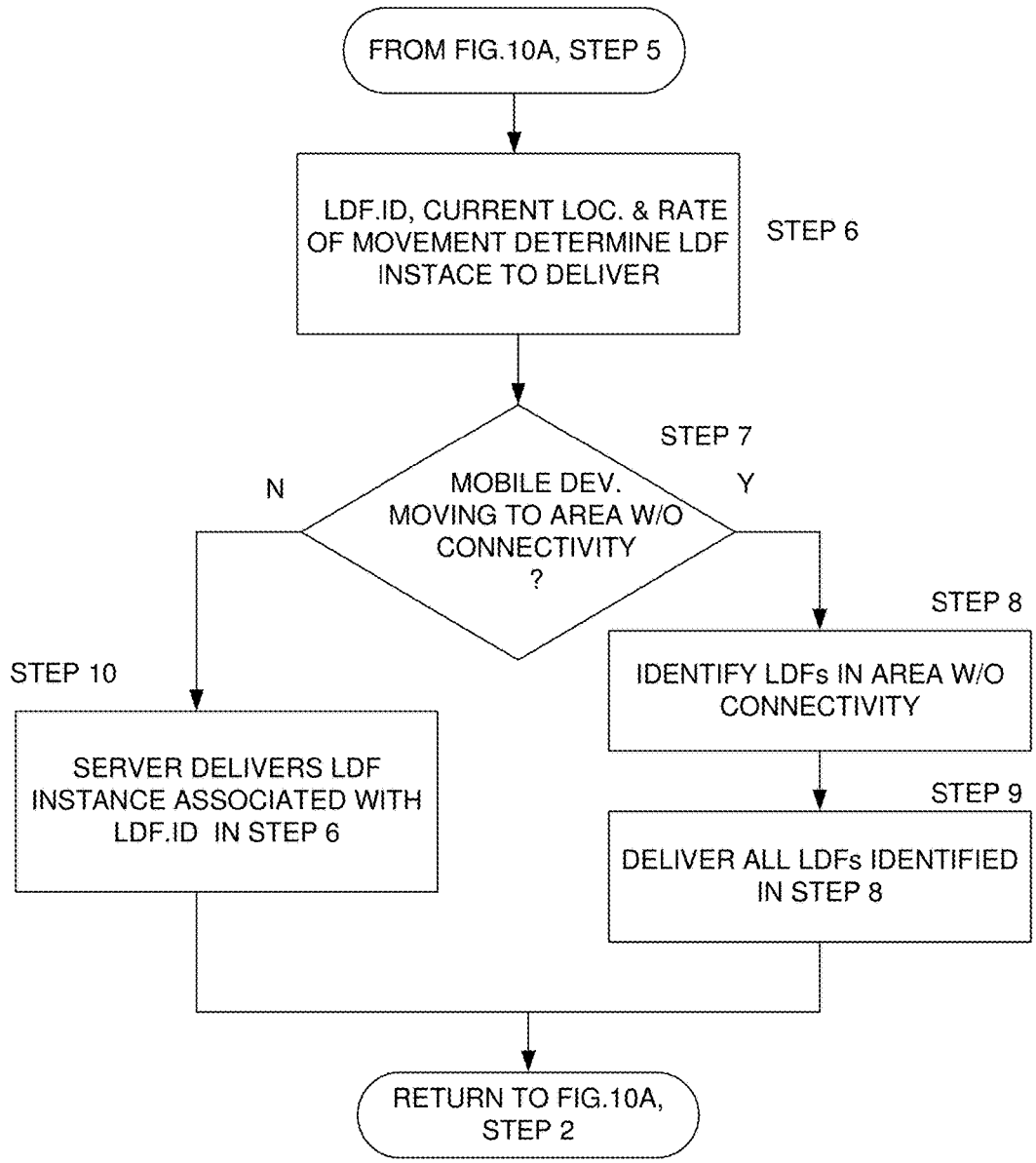

MEDIA CONTENT DELIVERY SYSTEM AND METHOD

CROSS REFERENCE TO RELATED APPLICATIONS

The application claims priority to and is a divisional of U.S. patent application Ser. No. 15/048,543, filed Feb. 19, 2016, and entitled MEDIA CONTENT DELIVERY SYSTEM AND METHOD, the entire contents of which are incorporated herein by reference.

FIELD OF THE INVENTION

The present disclosure relates generally to the delivery of media content based upon a location and movement of a mobile communication device, and particularly to the delivery of content in a location that does not have wireless network connectivity.

BACKGROUND

The nearly ubiquitous availability of wireless network connectivity has revolutionized the manner in which information is delivered to mobile communication devices. As a consequence, information of interest can now be delivered in real-time to users of mobile communication devices where and when it is most useful. The current generation of mobile computer applications can operate in conjunction with geographic positioning systems (GPS) to deliver information or media content that is relevant to the current location of a mobile communications device. Such mobile computer applications can continually monitor the geographic position of the mobile communication device on which it is running, send this position information over a wireless connection to a networked server which can then deliver information to the mobile communication device that is relevant to the current geographic position of the device and which may be of interest to the device user.

Generally, with reference to FIG. 1, different wireless network technologies have been developed to fulfill different needs. Wide area wireless network technology, such as cellular technology, was developed to at first facilitate mobile voice communication, and then later was extended to deliver data and media information. Mobile access to cellular signals largely depends on strategically positioning enough cellular antennas in a geographic area to provide full coverage. While cellular signals propagate freely outside buildings, they do not necessarily propagate to the interior of certain types of buildings. So, in order to provide wireless access to networks on the interior of a building, local area wireless technologies, such as Wi-Fi and DECT, have been developed that can be used for voice and data communication, and for the sending and receiving of various other types of media content.

With the proliferation of wireless connectivity to networks that permits access to information stored in association with computational devices (i.e., servers) connected to these networks, a very large number of applications (mobile applications) are being developed that are compatible to run on mobile communication devices. During the time that a mobile device is connected to a wireless network, a user of the device is able to search for and down-load information that they are interested in and which is germane to their current geographic location. At some point network developers and mobile communication developers realized that by implementing geographic positioning system (GPS) functionality in a mobile communication device they could easily track the current location of a mobile device and use this current location as the basis for identifying information to be delivered to the mobile device. Such location-based information delivery applications can be configured to request or pull location dependent content from a network, or they can be configured to automatically accept certain type of information that is of interest to the device user. Regardless of the method, the delivery of information to a mobile device based upon the current location of that device was a step forward in the development of mobile applications.

In addition to adding location tracking functionality to mobile communication devices, wireless communication device developers found it beneficial to implement functionality in these devices that detects device motion and orientation. This functionality is typically implemented with an accelerometer, and the output of an accelerometer can be used to re-orient information that is displayed on a mobile device screen so that the user is not forced to re-orient the device in order to easily view the information.

BRIEF DESCRIPTION OF THE DRAWINGS

FIG. 9 illustrates the format of and information comprising an instance of content.

FIGS. 10A and 10B is a flow diagram illustrating the operation of content delivery logic running on either or both of the server 26 and the mobile communication device 27.

DETAILED DESCRIPTION

Figure 1:
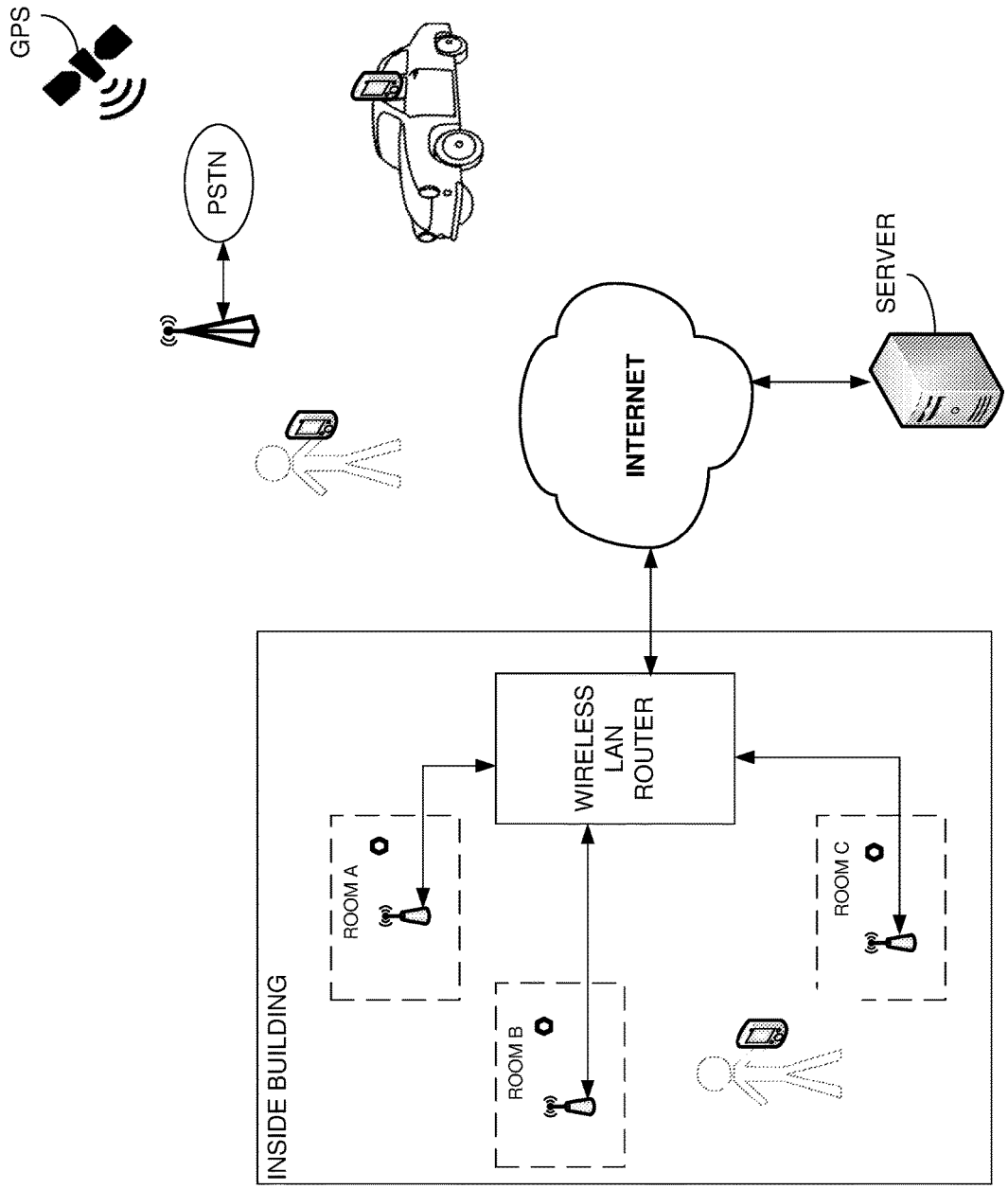
FIG. 1 is a diagram showing several wireless networks that support connectivity between a mobile communication device and a server.

While delivering information to a mobile computer application (mobile application) running on a mobile communication device (mobile device) based upon the current location of the device is a convenient means for the device user to receive and consume the information, delivering information in this manner does not make any allowance for the wireless network connectivity environment in which the mobile application is operating, and does not consider the current or recent history of mobile device movement prior to delivering the information. If a mobile device is currently located in an environment or a location in which it is not able to connect to a wireless network, this location is for all intents and purposes a dead spot with respect to the delivery of information of interest to the user, and as a consequence the information is not able to be delivered to the user for display in a timely manner, or at all. Further, current information delivery methods make no allowance for the speed with which a mobile communication device moves through its environment when delivering information. In the event that a mobile device is moving rapidly, such as in a vehicle, it is not convenient, or safe, for a user of the device to view certain types of information, such as textual, still image, or video type information. But under the same circumstances it may be convenient (and safer) for audio information to be delivered to the mobile application to be heard by the user. On the other hand, if a user of a mobile communication device is walking, then it may be convenient for them to receive information that is other than only audio, such as still pictures or video type content.

While access to a wireless network is nearly ubiquitous geographically, it is problematical to provide wireless connectivity in certain types of environments. As described earlier in the background section, this wireless coverage problem is largely the result of the environment in which a wireless network is operating.

I discovered that information, about a particular object located in an area not having wireless network connectivity, can be delivered to a mobile communications device while it is in in an area having wireless network service if it can be determined that the mobile communications device is likely to be moving from the area with wireless network service to the area without wireless network service. Further, depending upon the recent history or pattern of the mobile device movement, it is also possible to control the type of information that is displayed by the mobile device. The information delivered to the mobile communication device while moving towards an area without wireless network service can be displayed by the mobile device at a time when the mobile device is proximate to the object corresponding to the information that is delivered. The information about the object delivered prior to moving to the area without wireless network service comprises a location defined file (LDF), and it is this location defined file which is delivered to the mobile device prior to moving to the area not having wireless service.

Hereinafter, the information comprising the location defined file that is delivered to the mobile application is referred to as media content or simply content, and the different types of formats of media content (content) can be any combination of one or more of, but are not limited to, audio content, still image content, video content, textual content in varying quantities or amounts for delivery to the mobile application over longer or shorter periods of time and at higher or lower quality.

According to one embodiment, the mobile application operating environment is the interior of a building, such as a museum, but in other embodiments, the mobile application can operate in an environment that is open to the air. The environment in which the mobile application is running is not important to its operation, it is only important that the rate of movement of the mobile device on which the mobile application is running can be determined, and that a current or past geographic or indoor position can be determined. While the mobile device described herein operates to deliver LDF instance associated with a guided museum tour, it should be understood that the operation of the mobile application is not limited to a guided tour or to a tour corresponding to subject matter located in the interior of a building.

Figure 2:
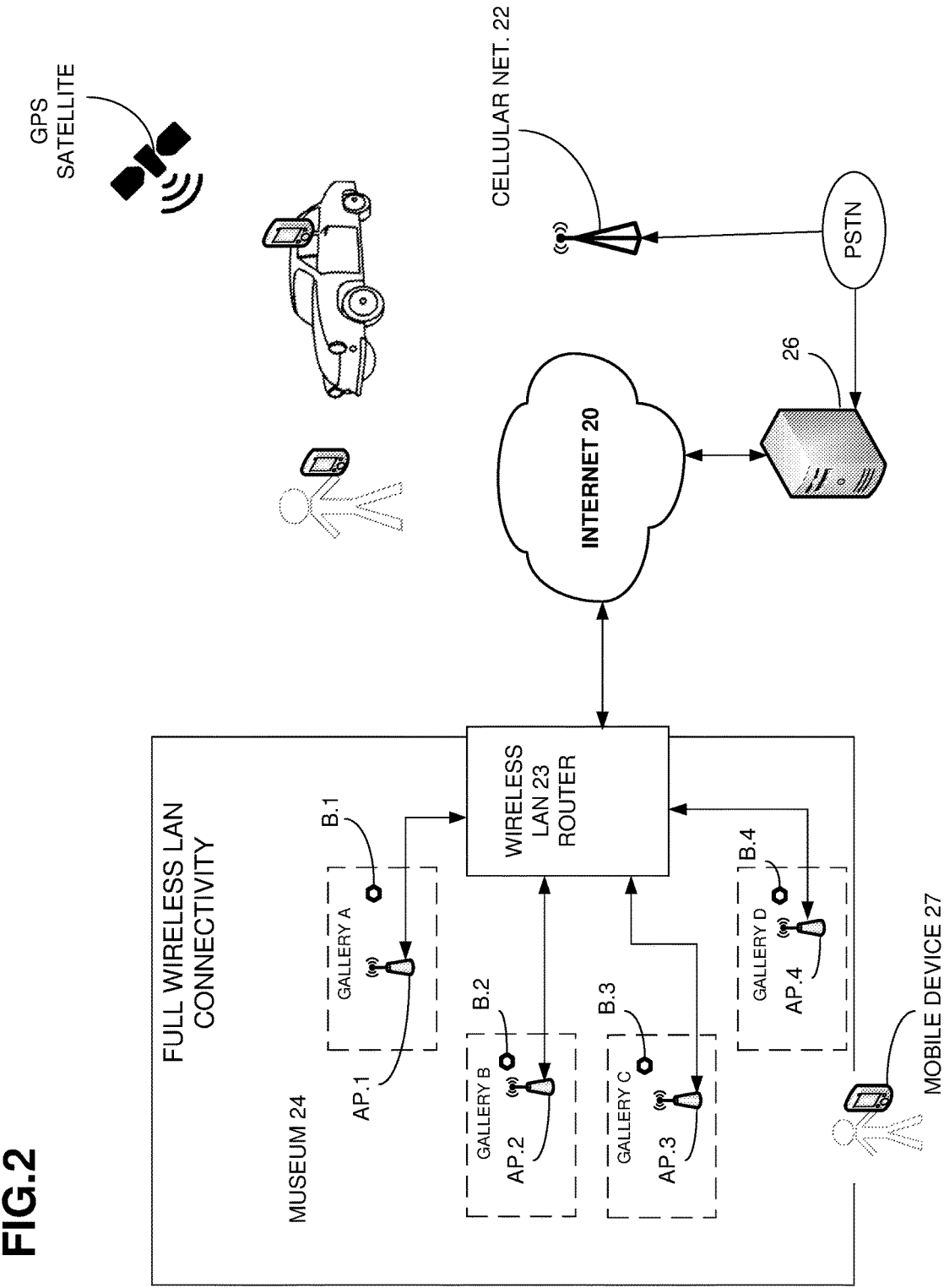
FIG. 2 is a diagram showing elements comprising a local wireless network with full interior building coverage and its connection to a wide area network.

FIG. 2 generally illustrates a communication network topology that can be used to deliver LDF instance to a mobile application running on a mobile device 27 under the control of an individual who is touring a Museum 24. A portion of the communication network topology is located external to the Museum and is comprised of a server 26 that is connected to two types of wide area networks, one type of which is a wired network (Internet 20) and the other one of which is a wireless network (cellular network 22). The interior of the Museum 24 is divided into a number of separate rooms or galleries, Gallery A, Gallery B, Gallery C, and Gallery D, and an individual with a mobile communication device 27 is illustrated to be walking around the Museum. The interior space of the Museum is served by a wireless LAN network 23 (The interior of the Museum can also be served by the cellular network as well) that is connected to the Internet 20, and is comprised of a router and four wireless access points, labeled AP.1-AP.4, one in each gallery. Each gallery also has at least one beacon, and these beacons are labeled B.1-B.4 for gallery A, B, C, and D respectively. The wireless LAN can be implemented with any type of suitable wireless network technology, such as Wi-Fi or DECT technology, and the beacons are wireless devices that transmit a low powered signal into their environment that uniquely identifies each beacon. Each beacon can be configured to have a unique identifier, and it can be placed in a known position in the Museum and used as part of a system to determine a current position of the mobile device 27. While each gallery in the Museum is shown to have only one beacon, there can be more than one beacon placed in each gallery which has the advantage of allowing an interior positioning system to determine, with some degree of accuracy, the current geographic position of a mobile communication device in the interior of the Museum, and while each gallery is shown to have one access point, there is no need to position an access point inside a gallery, or inside each gallery, as these access points only need to be located strategically in the interior of the museum to provide full wireless connectivity. While the interior positioning system described above employs a plurality of beacons to operate, other interior GPS systems can also be employed.

Continuing to refer to FIG. 2, the mobile communication device 27 is under control of the individual or user who is walking around the Museum, and the device 27 is running a mobile application (full application or thin client) that generally operates to display LDF content comprising descriptive information or subject matter relating to each object of art on display in the Museum. The subject matter comprising the content that is displayed to the user depends upon the current position of the device 27 in the Museum, and this content can be presented to the device 27 user in several different formats or types, and the type of content displayed depends upon a current or history of the device 27 movement through the Museum. As described earlier, the different types of formats of media content (content) can be any combination of one or more of, but are not limited to, audio content, still image content, video content, textual content in varying quantities or amounts for delivery to the mobile application over longer or shorter periods of time and at higher or lower quality. As the mobile device 27 moves to a position that is proximate to an object in the Museum, a location defined file having content relevant to that object can be delivered by a server 26 to the mobile device 27 via an access point connected to the wireless LAN 23 or via the cellular network 22, and the type of content that is displayed can depend upon the rate at which the device 27 moves through the Museum. This rate of movement can be an instantaneous or current rate of movement, it can represent a history of recent movement, or a combination of current and historical movement. The history of a first individual's movement through the Museum can be stored in the server 26 and used to control the display of content to that individual the next time they tour the Museum, or it can be used to control the display of content to another, second individual, who is friendly with the first individual, so that the second individual can share in the first individual's museum experience.

Typically, and provided that the mobile device 27 has adequate connectivity to the LAN 23 or to the cellular network 22, the server 26 is able to deliver the appropriate location defined file and display the appropriate type of content to the mobile application running on the device 27 as needed and in a timely manner. However, in the case that the wireless LAN 23 or cellular network 22 does not provide full coverage to one or more galleries in the Museum, then it is not always possible to deliver content to the device 27 in a timely manner.

Figure 3:
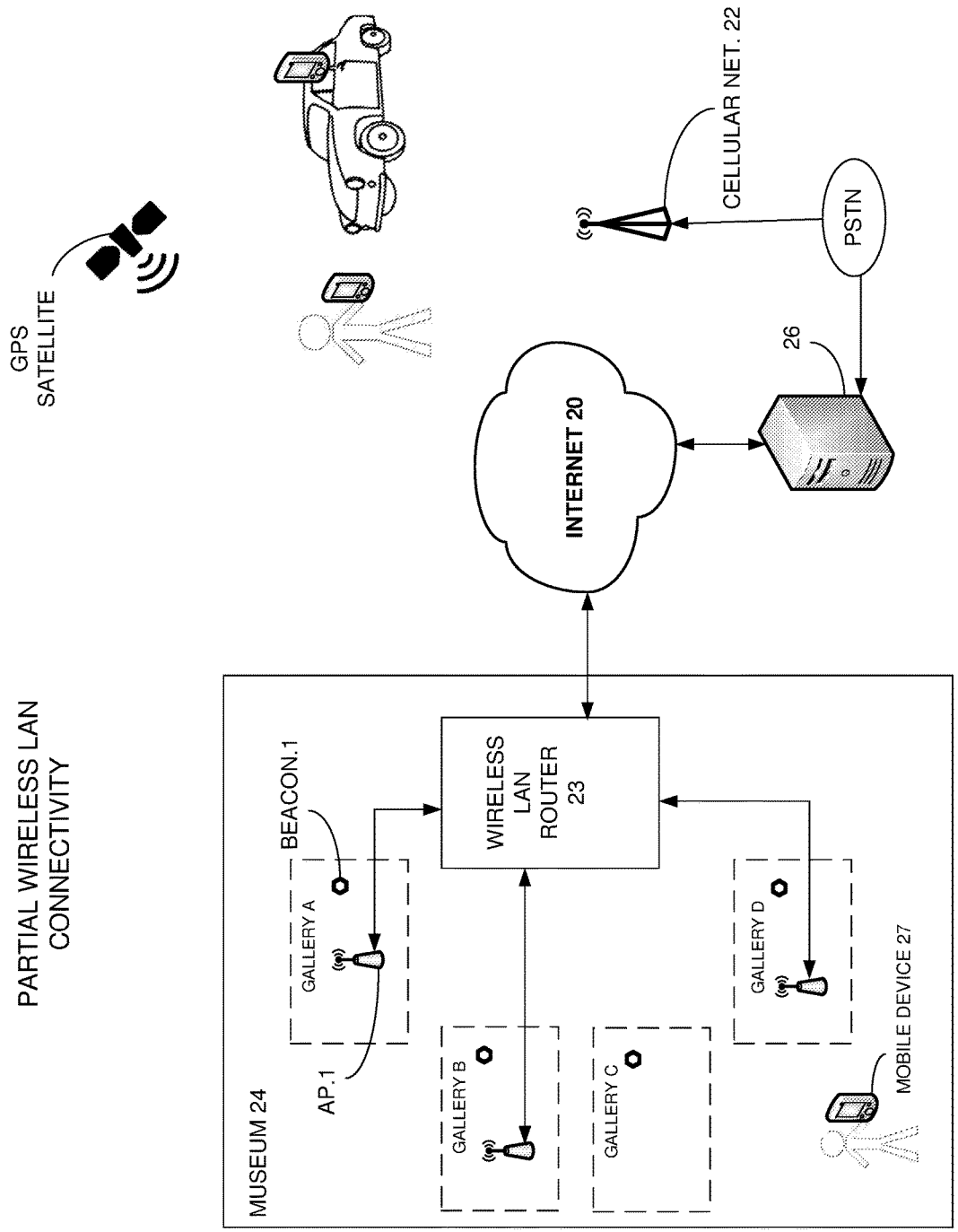
FIG. 3 is a diagram that is similar to FIG. 2A, but showing partial local wireless network coverage.

FIG. 3 illustrates the same Museum 24 as described with reference to FIG. 2, with the same galleries, same beacons and with access points in all of the galleries except Gallery C, which does not have wireless network service. Under these circumstances, and provided there is no connectivity to the wireless network, it is not possible for the device 27 to receive LDF content from the server 26 after it has entered Gallery C. However, and according to one embodiment, the server 26 has functionality that can anticipate the movement of the device into an area that is not served by a wireless network, which in this case is Gallery C, and the functionality can operate to deliver the LDF content prior to the device 27 entering Gallery C. So, for example, if the mobile device is currently moving through Gallery B, and based upon this movement the server 26 functionality determines that the mobile device will probably move into Gallery C, then the server can deliver the LDF content relating to objects on display in Gallery C while the mobile device is still positioned in Gallery B. The content comprising the delivered LDF can be of one particular type, or it can be comprised of multiple different types of content. In the case that the device 27 exhibits a regular rate of movement between galleries and between paintings in the galleries, it may only be necessary to display a type of content that corresponds to this type of movement. But in the case where the rate of movement is irregular, several different types of content for each painting (or other object on display) may be displayed by the mobile application. Then, the appropriate type of content can be displayed according to the current rate of movement of the mobile device 27.

Figure 4:
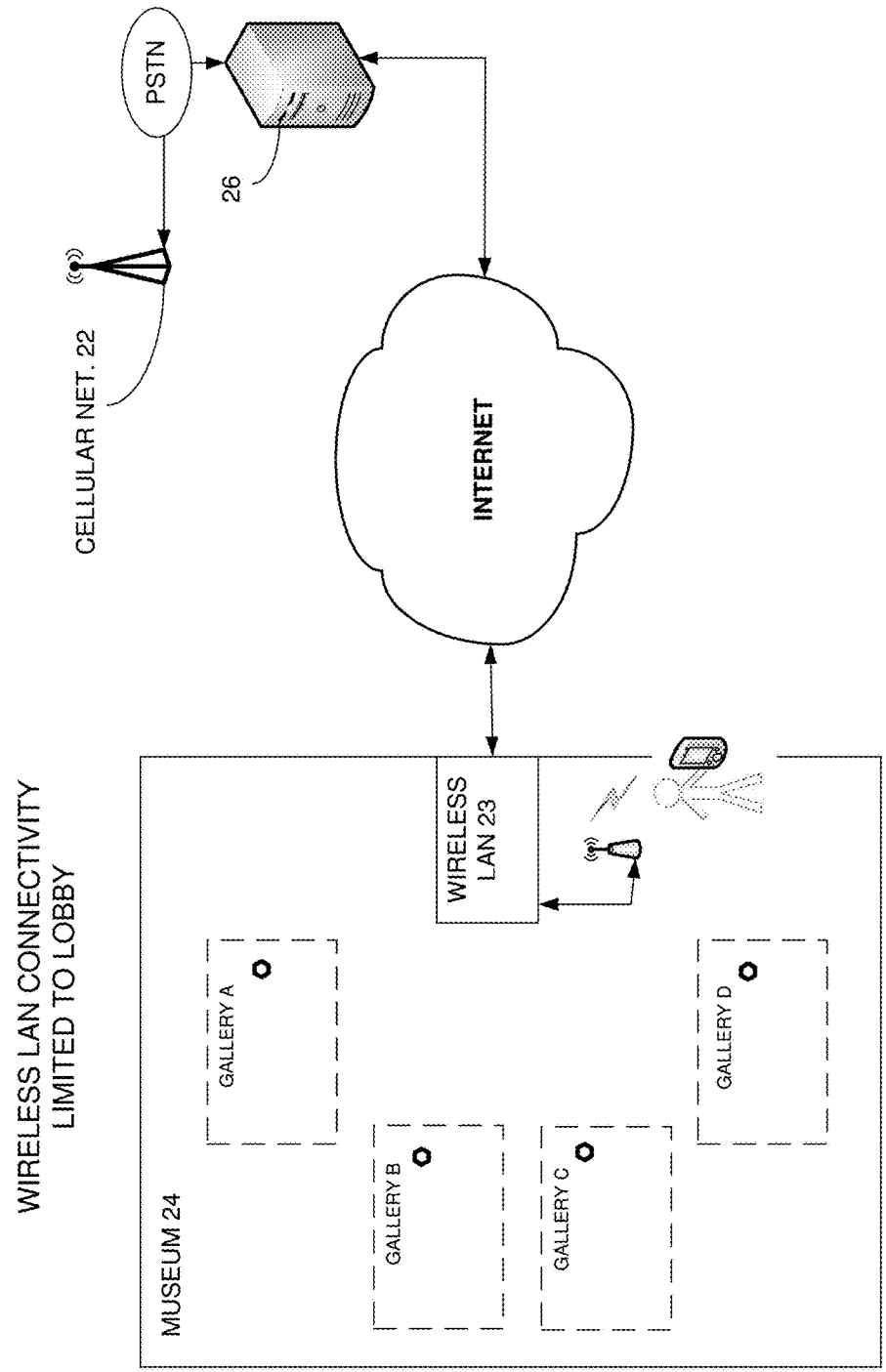
FIG. 4 is a diagram showing wireless network coverage limited to a lobby area and with active beacons.
Figure 5:
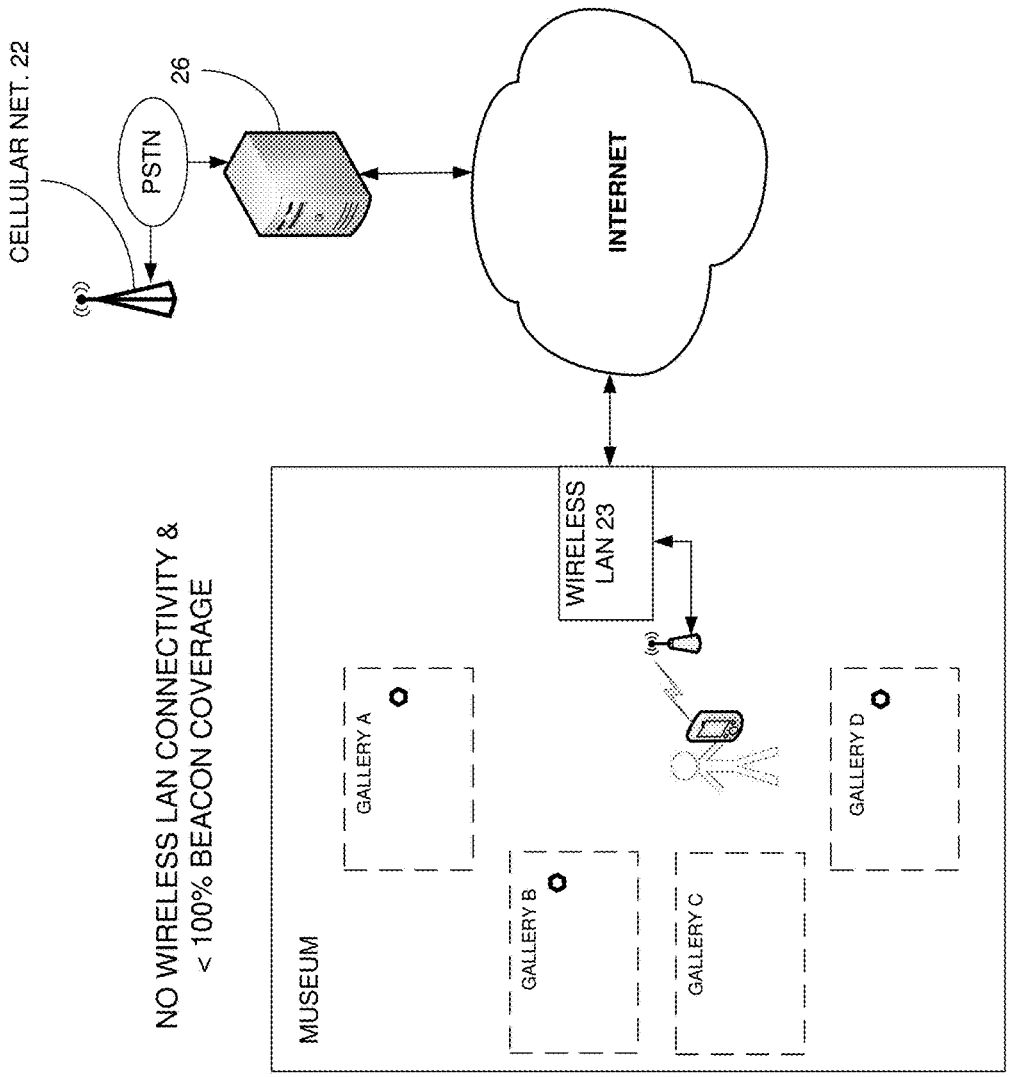
FIG. 5 is a diagram showing no indoor wireless network coverage with less than 100% active beacon coverage.

Referring now to FIG. 4, in the event that connectivity to a wireless network (either LAN or cellular) is limited to a lobby area located in a building's interior, or there is no availability to wireless service, the server 26 can deliver all of the LDF content relating to objects on display as the mobile device 27 moves into the Museum lobby, or the server 26 can deliver the LDF content over a cellular connection prior to the mobile device entering the Museum. Regardless of the network used to deliver the LDF content, the mobile application running on the mobile device 27 can operate to display the appropriate LDF and associated content depending upon the mobile device's location in the Museum and the rate at which the mobile device is moving about the Museum. Now, considering that the wireless LAN 23 topology in FIG. 5 is the same as in FIG. 4, but there are no beacons in Gallery C, the mobile application running on the mobile device 26 can operate to anticipate the movement of the mobile device from Gallery B to Gallery C and send the appropriate LDF content at a time that a beacon signal in Gallery B falls below some threshold signal strength.

As described earlier, regardless of the wireless network over which the mobile device 27 receives the LDF content, the subject matter comprising the content that is displayed by the mobile application running on the mobile device 27 depends upon the currently known position or an anticipated future position of the mobile device 27, and the type of content displayed depends upon the current and/or history of the rate of movement of the mobile device 27 through a building interior, such as the Museum 24, or through an open air environment. The type of content that is displayed by the mobile application can change from one gallery to another, or it can change during time spent in one gallery, or the type of content displayed may not change depending upon the current rate of movement of the mobile device 27 or the past history of movement of the device 27. For example, and referring back to FIG. 2, if an individual is walking from Gallery A to Gallery B at a relatively low rate of speed, the type of content that can be displayed by the mobile application as the individual enters Gallery B can be of relatively high quality with respect to pixel density, correctness of color, or some other criteria, and it can be in a relatively long format (i.e., more text or audio, better/larger image, etc.), On the other hand, if the individual is walking from Gallery A to Gallery B at a relatively fast rate of speed, then the type of content that can be displayed by the mobile application as the individual enters Gallery B can be of relatively lower quality. In this case, the content can be displayed in a shortened form that can include audio content, no image, and no text for instance.

Additionally, the rate of movement proximate to an object on display at the Museum can determine what type of content can be displayed by the mobile application. If it is determined that the mobile device 27 spends more than some selected threshold period of time (lingers) in a particular location, then the type of content that is displayed can include more detail (more text, more audio, more pictures, artist biography, etc.), and the content can continue to be displayed by the mobile application for as long as the device 27 lingers proximate to the location. The methods which can be employed to determine lingering time, as well as any other movement, will be described later with reference to FIGS. 7 & 8.

Figure 6A:
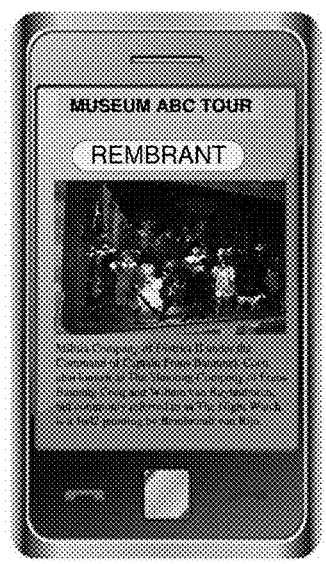
FIGS. 6A to 6D illustrate the different types of media content that can be delivered to a mobile communication device for display.

FIGS. 6A to 6d illustrate the different types of content that can be displayed by the mobile application on the mobile device 27 screen. In this case, the mobile device 27 is currently located in Museum ABC in Gallery A, and is proximate to a painting by Rembrandt entitled "The Night Watch". FIG. 6A represents content that can be displayed by the mobile application if it is determined that the mobile device 27 is moving relatively slowly through the Museum ABC. In the context of this description, a rate at which the mobile device 27 is moving is only quantified as a relative value. While an accelerometer operating in conjunction with the device 27 is able to measure an absolute rate of movement, and this measured, absolute rate of movement can be used to determine if the device 27 is currently moving faster or slower than in the past, there may or may not be any universal correspondence between an absolute, measured rate of motion and the type of content that is delivered. For example, an individual using the device 27 can be moving more or less rapidly between paintings and spending quite a bit of time lingering at each painting or not. The rate at which each individual walks can be different, and the amount of time any particular individual lingers at a painting varies. The mobile application can learn the walking and lingering habits of each individual and adjust the rate of motion to coincide with the delivery of a particular type of content. Prior to receiving the content that is displayed in FIG. 6A, the mobile device 27 is moving relatively slowly, both between galleries and between paintings, and the individual using the device 27 is lingering for a relatively long period of time at each painting. In this case, a hi-quality, full size image of Rembrandt's painting is displayed by the mobile application along with a long form text description of the painting.

Figure 6B:
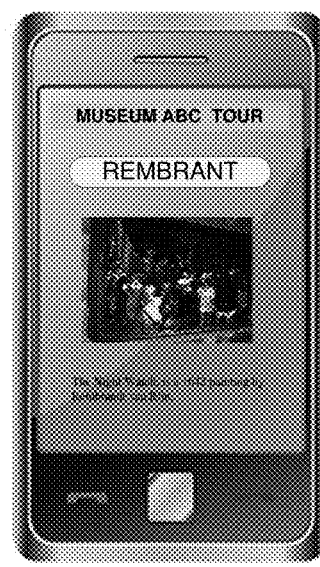
Figure 6C:
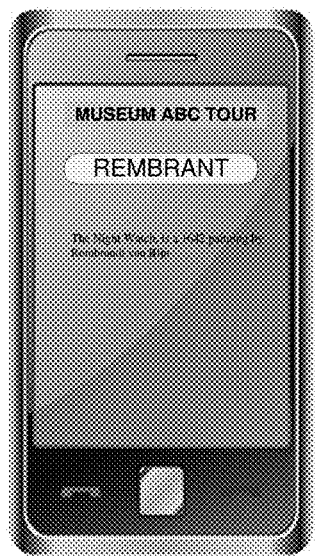
Figure 6D:

Referring to FIG. 6B, it can be seen that the mobile application displays a relatively smaller image of similar quality with respect to the image displayed in FIG. 6A. This image is displayed along with a shorter form text description of the painting with respect to the text displayed in FIG. 6A. In this case, the mobile device 27 can be moving more rapidly between galleries or between paintings in a gallery than with respect to the movement detected in FIG. 6A, or they can be lingering at each painting for a relatively shorter period of time with respect to the lingering time detected in FIG. 6A. FIG. 6C illustrates the type of content delivered if it is determined that the mobile device 27 is moving at a rate that is relatively faster and/or lingering for a shorter period of time with respect to the movement detected with reference to FIG. 6B. In this case, only textual information is displayed with no image of the painting. Then, in FIG. 6D, it can be seen that only audio type content is delivered to be played by the mobile application. In this case, the device 27 is detected to be moving relatively rapidly and so a minimum amount of content is being delivered.

Figure 7A:
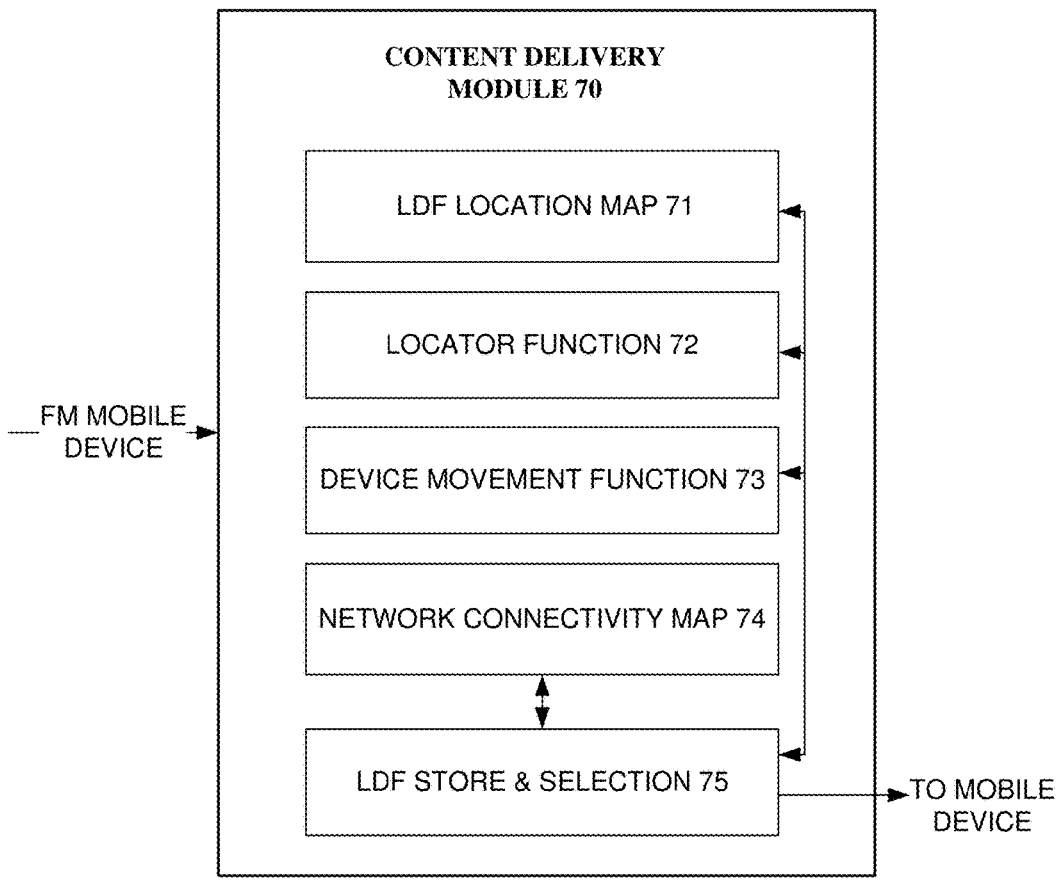
FIG. 7A is a diagram showing functional blocks comprising a server 26.
Figure 7B:
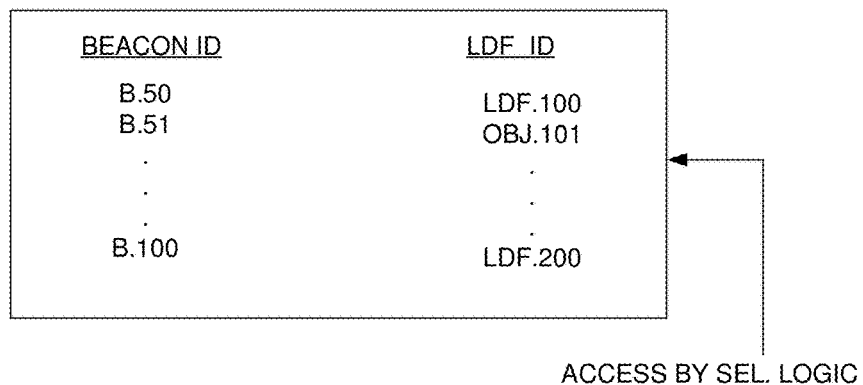
FIG. 7B is diagram illustrating the structure of an object location map 71.

FIG. 7A is a diagram illustrating functional blocks implemented in a LDF delivery module 70 comprising the server 26 described with reference to FIG. 2. This module 70 operates to deliver LDF instances to a mobile application running on a mobile device, such as the mobile device 27. The timing of the LDF delivered to the mobile device depends upon a current known or predicted future location of the mobile device, the current rate of movement or past history of movement of the mobile device, and it depends upon whether or not the mobile device is able to establish a network connection with to the server 26. The delivery module 70 maintains an LDF location map 71 that relates a listing of some or all of the location defined files having content describing objects on display at the Museum 24 to physical locations (beacons) in the Museum, it has a locator function 72 that is comprised of a GPS or indoor positioning system functionality and a listing of mobile devices currently connected to the server 26, it has a device movement function 73, it has a network connectivity map 74, and it has a LDF storage and selection module 75. While the LDF location map 71 is described as being maintained by the delivery module 70 running on the server 26, the map 71 can be created and stored in association with the mobile application 80 running on the mobile device 27. This map 71 can be created using a publicly available wireless hot-spot application, or it can be created by in an ad-hoc manner by a group of devices communicating to each other using an ad-hoc, wireless, peer-to-peer (p2p) network. If created in the ad-hoc manner, each mobile device in the p2p network can periodically detect and share a current wireless network service status detected at a particular location, in the Museum for instance, and in this manner a map of service connectivity can be created and shared with others connected to the ad-hoc network or in some other manner.

The map 71 defines a correspondence between beacon identities and the identity of at least one location defined file having the information about the objects of art in the museum 24. According to one embodiment, the identity of a single beacon corresponds to the identity of an LDF. According to another embodiment, the signal strength of more than one beacon is employed to identify an LDF. Signal strength measurements received from one or more beacons proximate to each displayed object can be recorded and entered into the map in association with that object. As described earlier, each beacon is assigned a unique identifier that each beacon periodically or continually transmits in a low power signal. A device that is configured to receive a beacon signal can determine the identity of each beacon using this unique identifier, and by detecting a beacon signal strength is able to determine how far an object is from each of one or more beacons. This information is then stored in the map 71 in association with an LDF having information that is descriptive of an object that is positioned proximate to the location in which the beacon signal strength is recorded. It should be understood, that while the embodiment described herein uses beacon technology as means to determine an interior location, other interior location systems can also be employed for this purpose.

Continuing to refer to FIG. 7A, the mobile device locator function 72 operates to determine either or both of a current interior location and a current exterior location of a mobile device, such as the mobile device 27, and it detects and maintains a listing of the mobile devices that are currently connected to the server 26. Depending upon the correspondence of beacons to location defined files, the function 72 can receive information that uniquely identifies a particular beacon, or it can receive signal strength information corresponding to multiple beacons as measured by a mobile device, such as the mobile device 27. The locator function 72 can use this beacon identity or signal strength information to determine the current interior location of the mobile device, and then store this location. The function 72 can also receive GPS location information from the mobile device and store this information.

The device movement function 73 operates to receive the identities of and location information comprising each one in a sequence of LDFs sent to a particular mobile communication device, and use this information to determine a recent pattern of movement by each mobile device within a particular area serviced by the wireless network This current pattern of movement information can be stored and used by logic comprising a LDF store and selection module 75 to determine which LDF instances are delivered to each mobile device. A Network connectivity map 74 maintains information relative to locations in the Museum at which connectivity to a wireless network (either or both of a wireless LAN or Cellular network) is available. In this regard, the availability of connectivity to a wireless network can be maintained relative to each gallery in the Museum, within each gallery in the Museum, between galleries in the Museum or at any level of granularity that that facilitates the delivery of content to the mobile application.

Continuing to refer to FIG. 7A, the LDF store and selection module 75 maintains a plurality of instances of location defined files, and each instance of an LDF is comprised of one or more types of content corresponding to a particular object of art on display at the Museum. Content comprising each LDF can be maintained in several different forms, each of which represents a different content type. In addition to the instance of an LDF, the content store and selection module 75 has logic that selects, based upon the current mobile device location, rate of movement and network connectivity, an LDF instance that is delivered to the mobile device.

FIGS. 7B, 7C, 7D and 7E illustrate in more detail the elements comprising the LDF location map 71, the device locator function 72, the device movement function 73, the network connectivity map 74, and the LDF store and selection module 75. Turning now to a description of the LDF location map 71 shown with reference to FIG. 7B, this map maintains a listing of beacons in the Museum and the unique identity of each beacon. According to one embodiment, a single beacon is positioned proximate to one object on display in the Museum, and accordingly, there is a unique correspondence in the map between one beacon and an LDF instance (which has information about an object on display proximate to the beacon. Information maintained in this map is used by LDF selection logic comprising the LDF delivery module 75 (described later with reference to FIG. 7E) to determine which LDF instance is delivered to a mobile device as it moves from one area to another an area through a museum for example.

Figure 7C:
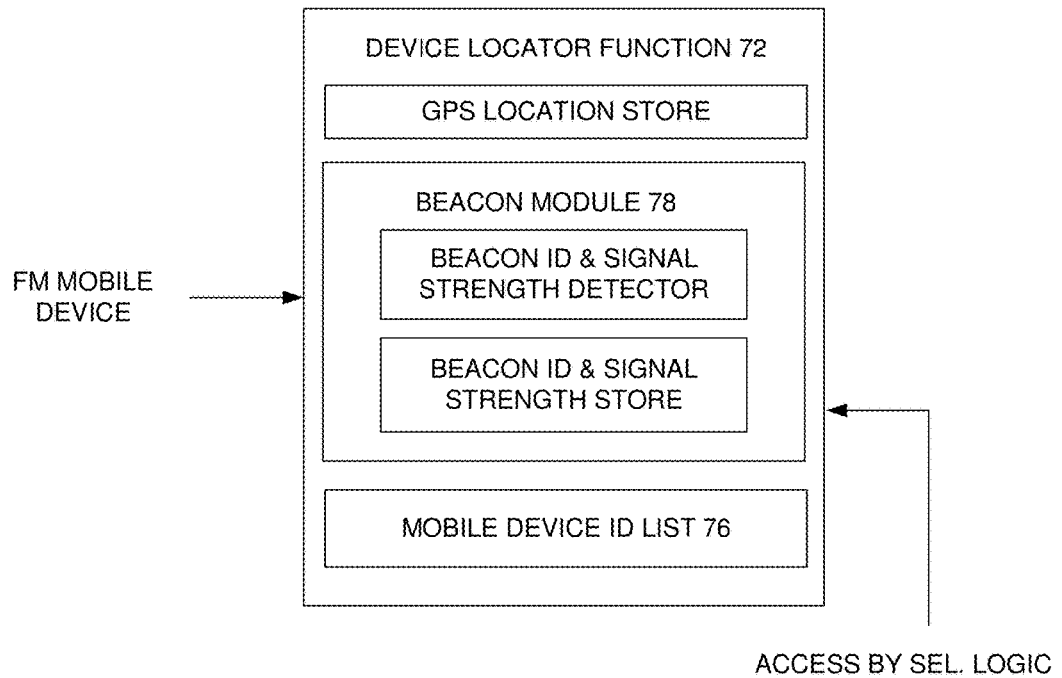
FIG. 7C is a diagram showing the functional blocks comprising a device locator function 72.

FIG. 7C illustrates the functional elements comprising the device locator function 72. The function 72 has a store of GPS location information that the server 26 can receive from a mobile device, it has a beacon module 78 that is comprised of a beacon identity and signal strength detector, and a store of beacon identities and associated detected signal strengths, and it has a listing of the mobile devices that are currently connected to the server 26. As a mobile device running a mobile application comes into range of a signal transmitted by a particular beacon, the mobile application detects a unique identity of the beacon that is transmitting the signal, it detects a strength of the signal transmitted by the beacon, and then sends this beacon identity information and signal strength information to the device locator function 72 operating in association with the content delivery module 70 running on the server 26. In operation, the function 72 receives GPS information or beacon identities and signal strengths, and the identities of mobile devices, and all of this information can be transmitted to the server in signals generated by a mobile application running on a mobile device 26. Location information stored in function 72 can be accessed by the content selection logic and used as a pointer into the map 71 for the purpose of determining which LDS is sent to a mobile device.

Figure 7D:
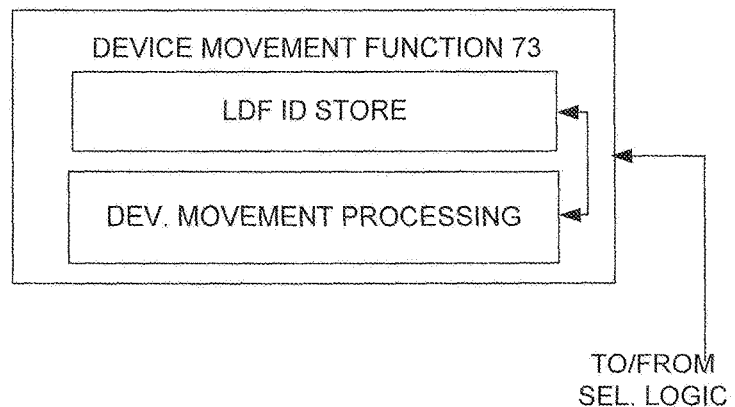
FIG. 7D is a diagram showing the functional blocks comprising a device movement function 73.

FIG. 7D illustrates the functional elements comprising the device movement function 73, which generally operates to store and process identity and location information comprising each in a series of LDF instances recently transmitted to particular mobile communication devices. This LDF identity and location information is used to determine a recent pattern of movement of each mobile communication device which can be used to determine that the mobile device may be moving from an area having wireless network service to an area not having wireless network service. The results of the movement processing function can be accessed by the LDF selection logic and used to identify one or more LDF instance to be delivered to a mobile device.

Figure 7E:
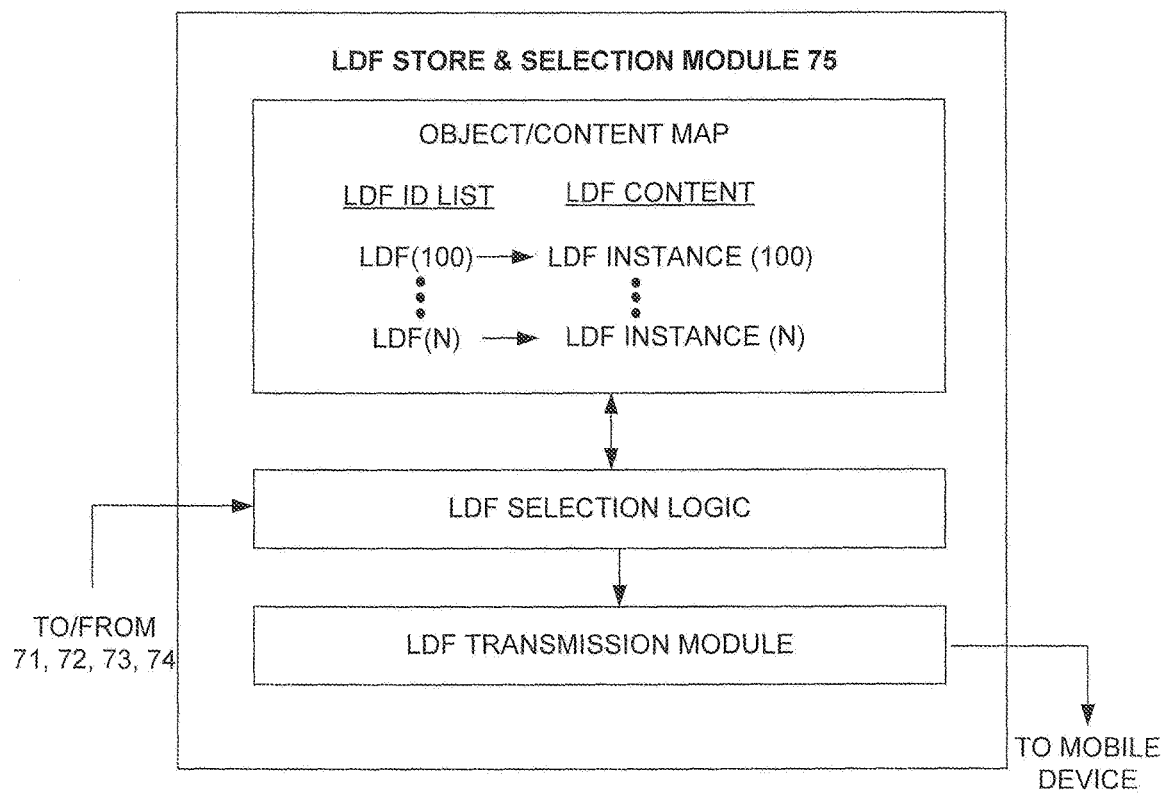
FIG. 7E is a diagram showing the functional blocks comprising a content store and selection module 75.

FIG. 7E illustrates functional elements comprising the LDF storage and selection module 75. The module 75 has a map or structure that relates the identity of each LDF in a list to a corresponding location defined file instance which in turn is comprised of media content that is descriptive of an object of art on display in the Museum. The media content comprising each LDF can comprise different types of content (i.e., Long-Form, Medium-Form, or Short-Form), all of which can be delivered to a mobile communication device. An example of a Long-Form type of content is illustrated with reference to FIG. 9. While only three different types of content are described here, it should be understood that fewer types or more types of content can be created and stored in association with the module 75. Module 75 also has logic that operates to select the appropriate instance of an LDF for delivery to a mobile device depending upon location and movement information associated with the mobile device that it receives from the locator function 72 and the movement function 73 comprising the content delivery module 70. This content selection logic operates on information stored or received from the location map 71, the locator function 72, the device movement function 73 and the network connectivity map 74 to determine which instance of a LDF is to be delivered to a mobile device. The operation of this logic is described later in detail with reference to FIGS. 10A and 10B. The LDF storage and selection module 75 also has an LDF transmission module that operates to send LDF instances to the appropriate mobile device at the appropriate time.

In one embodiment, a mobile device can connect to the server 26 regardless of its position in the Museum, in this case one or more LDF instances can be delivered by the server to the mobile device at the point that the server determines that the mobile device is moving to be proximate to an object on display in the Museum. In an alternative embodiment in which the mobile device moves to a location in the Museum where it is not able to connect to the server, then the server 26 can operate to anticipate this movement into the area without wireless connectivity, and deliver the appropriate LDF instance or instances to the mobile device for storage before the mobile device loses connectivity with the server. In the later embodiment, the mobile application running on the mobile device can determine the current location of the mobile device and display some or all of the content in the LDF that is appropriate to that location. The mobile application running on the mobile device 27 will now be described with reference to FIG. 8.

Figure 8:
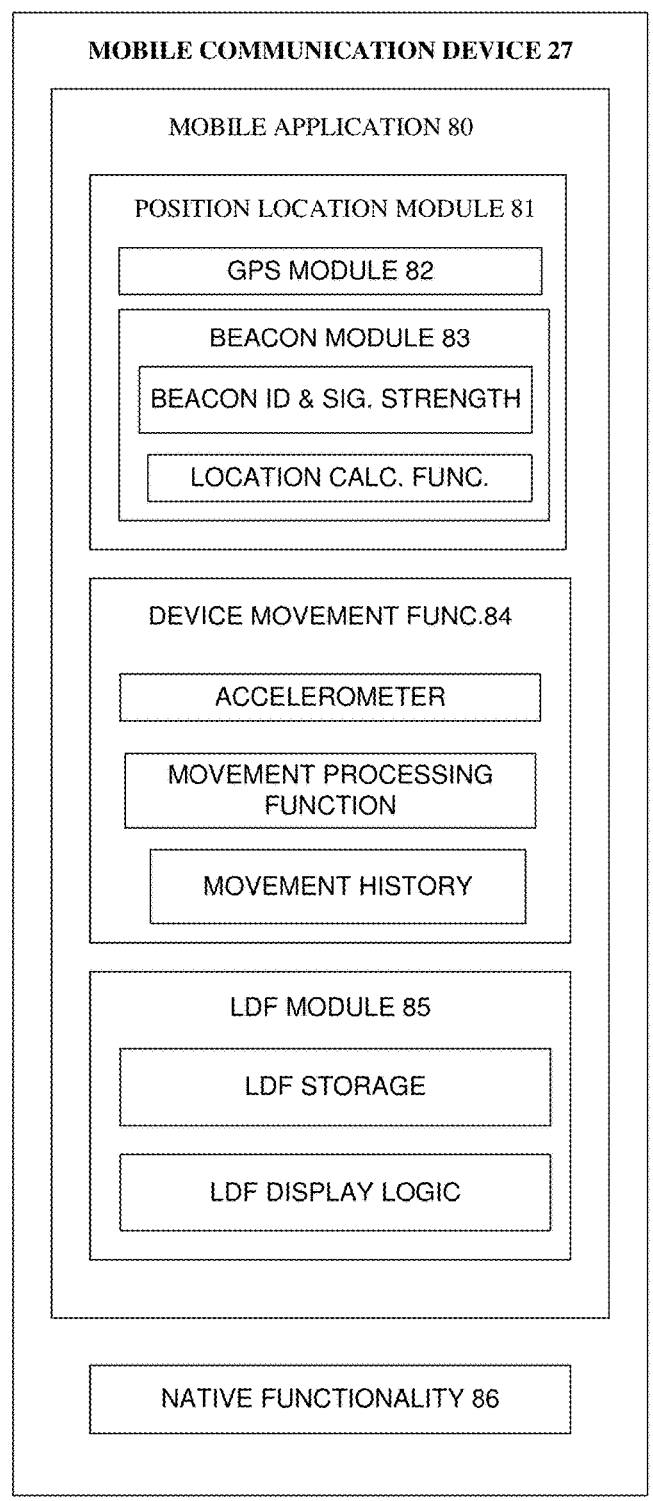
FIG. 8 is a diagram showing the functional blocks comprising a mobile communication device 27.

FIG. 8 is a block diagram showing functional elements comprising the mobile communication device 27 that has been referred to earlier. The mobile device 27 generally is comprised of the mobile application referred to previously which is labeled here as mobile application 80, and it is also comprised of application functionality 86 that is native to the mobile device 26. This native application functionality can include, but is not limited to, a wireless transceiver or radio that operates to send and receive wireless messages to and from a wireless network to which it is connected, digital camera functionality and voice processing functionality. The mobile application 80 is comprised of, among other things, a position location module 81, a device movement function 84 and an LDF module 85, and it generally operates to receive information from a GPS network or an indoor positioning system, and to send this information to the server 26 which uses this information to calculate a current position of the mobile device. More specifically, the position location module 81 has a GPS module 82 that operates (generally when the mobile device is open to the air) to receive signals from a GPS satellite, and use information in this signal to calculate a current geographic position of the mobile device. The position location module also has a beacon module 83 that generally operates to receive beacon signals and determine the identity of the beacon that sent the signal, and to determine the current beacon signal strength, and the beacon ID and signal strength can be sent to the server 26 that uses this information to determine the current location of the mobile device. Alternatively, if the mobile device is currently not connected to the server 26 (due to no wireless network connectivity), then the position location module 81 can use information it receives from a beacon to calculate a current position of the mobile device.

Continuing to refer to FIG. 8, the device movement function has an accelerometer, a movement processing function and a store of movement history. The accelerometer generally operates to detect a rate of movement or rate of change of movement of the mobile device 27 as it moves (is carried) around the Museum. Information indicative of movement generated by the accelerometer is sent to the server 26 where the information is used to calculate a current rate of movement. Alternatively, in the event that the mobile device is not currently connected to a wireless network, the function 84 can process the accelerometer information to determine a current rate of movement of the mobile device and store this information in a movement history. The LDF module 85 generally operates to receive LDF instances from the server 26, and the content comprising an LDF can then be displayed at an appropriate time depending upon the current position of the mobile device. The LDF module 85 can maintain one or more instances of an LDF depending upon information in the connectivity map 74 stored on the server 26 and depending upon the current location of the mobile device. If the server 26 determines from the current location of the mobile device and from the recent history of movement that the mobile device is moving from a Museum location that provides wireless connectivity to another location that provides wireless connectivity, then it can deliver an LDF as it is needed to the device as it moves through the galleries. On the other hand, if the server 26 can predict that the mobile device is likely moving to a Museum location (Gallery C for instance in FIG. 3 for instance) in which there is no wireless connectivity, then the server can deliver one or more LDFs to the mobile device in anticipation of this movement, and before the mobile device loses connective with the server 26. In this case, the mobile application 80 running on the mobile device 27 can operate independently of the server 26 to display LDF content of an appropriate type according to the location of the mobile device in Gallery C, and according to the current rate of movement of the device.

The operation of the LDF content selection logic comprising the server 26, described with reference to FIG. 7E, will now be described with reference to the logical flow diagram illustrated in FIGS. 10A and 10B. Generally, the LDF selection logic or simply selection logic implemented in the selection module 75 described with reference to FIG. 7E operates to determine a current location or a predicted future location of the mobile device 27, and then deliver the appropriate LDF instance to the mobile device. The type of content comprising the delivered LDF that is display by the mobile device can depend upon a current motion characteristic (i.e., rate of motion) or a recent characteristic motion history of the mobile device. According to one embodiment, the timing of the delivery of the LDF to the mobile device is based upon knowledge of a wireless network connectivity topology or map. In the case that the logic determines that there is wireless connectivity in an area of the Museum (Gallery A in FIG. 3 for example) that the mobile device is moving towards, then it operates to cause the appropriate LDF to be delivered to the mobile device on a just-in-time basis while it is moving through Gallery A. On the other hand, if the logic determines that there is no wireless network connectivity in an area of the Museum (Gallery C in FIG. 3 for example) that the mobile device is determined to be moving towards, then it operates to cause all of the appropriate LDF associated with each of the objects on display in Gallery C to be delivered to the mobile device before it moves into Gallery C. Operating in this manner, this logic ensures that a mobile device is always able to display LDF content that is appropriate to an object it is proximate to regardless of whether the mobile device is able to connect to a wireless network or not.

Referring to FIG. 10a, in Step 1 a mobile device, such as the mobile device 27, enters the Museum 24 and attempts to connect to a wireless network. If, in Step 2, the mobile device is able to connect to a wireless network, the process proceeds to Step 3 and the logic starts looking for a beacon identity and a beacon signal strength sent in a message from the mobile device and stored in function 72 of the server 26. On the other hand, if in Step 2 the mobile device is not able to connect to a wireless network, the process loops on Step 2. If, in Step 3, the logic detects that at least a beacon identity (and optionally a signal strength) is stored in the locator function 72, then the process proceeds to Step 4, otherwise, the process loops on Step 3 until at least a beacon ID is detected. In Step 4, the logic uses the identity of the beacon (and optionally the signal strength information) to determine the identity of an LDF that corresponds to the beacon location. In this regard, the logic uses the beacon ID as a pointer into the map 71 to identify the identity of an LDF. So, for example, if the beacon ID is B.50, then the logic enters the map or table 71 at B.50 and looks for an LDF that relates to this beacon, which in this case is the LDF, LDF.100. After the logic retrieves the identity of the LDF, the process proceeds to Step 5, and the logic determines whether or not the mobile device is proximate to an object of art about with the LSF.100 has content, by determining whether the beacon, B.50, signal strength value is higher than some selected threshold value, and if so, then the process proceeds to Step 7 in FIG. 10B. Otherwise the process returns to Step 3.

Referring now to FIG. 10B, in Step 6 the logic uses the identity of the LDF determined in Step 4, and the current location, as determined in Step 5 to determine that the LDF identified in step 4 is appropriate to be delivered to the mobile device. Then, depending upon the current rate of movement of the mobile device, the LDF display logic comprising the LDF module 85 running on the mobile device 27 can select one of a short form, medium form or long form type of content comprising the LDF for display. In Step 7, if the LCF selection logic determines that the mobile device is moving into an area that does not provide wireless network connectivity, then in Step 8 the logic identifies the one or more instances of LDFs corresponding to this area (using the map 71) and in Step 9 delivers the appropriate one or more identified LDF instances to the mobile device. However, if in Step 7 the logic determines that there is connectivity, then the process proceeds to Step 10 and the content identified in Step 6 is delivered to the mobile device, and the process can return to Step 2 in FIG. 10A.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. Displaying media content corresponding to an object of art on a mobile communication device, a method comprising:
    detecting, at a computational device connected to a network, the identities of two or more in a sequence of location defined files sent to the mobile communication device, wherein each of the location defined files have position information and media content information that is descriptive of an object of art;
    determining by the computational device that, based upon position information comprising two or more most recently received location defined files, the mobile communication device is moving from an area that has wireless network service to an area that does not have wireless network service;
    identifying at least one of a plurality of location defined files, stored in association with the computational device, having position information that maps to the area not having wireless network service, and sending the at least one identified location defined file to the mobile communication device prior to it moving to the area not having wireless network service; and
    the mobile communication device displaying at least some of the media content comprising the at least one identified location defined file received from the computational device when the mobile communication device determines that it is proximate to the position corresponding to the location information in the location defined file.

2. The method of claim 1, wherein each of the plurality of the location defined files have a plurality of instances of media content each of which is descriptive of the object, and each of the instances of media content comprise information of a different type.

3. The method of claim 2, wherein the different types information in the instances of media content comprising each of the location defined files is any one or more of video information, audio information, textual information, and still image information.

4. The method of claim 3, wherein the type of media content displayed by the mobile communication device is dependent upon the rate of speed of the mobile communication device.

5. The method of claim 4, wherein the rate of speed of the mobile communication device is calculated using the location information comprising each of the sequence of location defined files sent to the mobile communication device and a timestamp assigned to each location defined file at the time it is sent to the mobile communication device.

6. The method of claim 1, further comprising detecting a duration of time that the mobile communication device remains proximate to the location of an object of art for which the location defined file is received.

7. The method of claim 6, wherein the duration of time is calculated based upon the timestamp assigned to each location defined file at the time it is sent and a timestamp assigned by the mobile communication device to the location defined file when it detects that it is moving away from the object of art.

8. The method of claim 6, wherein the duration of time is used to determine what type of media content is displayed by the mobile communication device.

9. The method of claim 1, further comprising the identities of each of the two or more in a sequence of location defined files sent to the mobile communication device is determined based upon a location of the mobile communication device that matches position information comprising each of the location defined files.

10. The method of claim 1, where the mapping of location define file position information to areas not having wireless network service is created by a wireless hot-spot mapping application running on one or more of a plurality of mobile communication devices communicating with each other over an ad-hoc wireless network, or created by a plurality of mobile devices in communication with each other over the ad-hoc wireless network by detecting the wireless network signal strength information and to share this information with the other of the plurality of the mobile communication devices.

11. The method of claim 10 wherein the mapping is maintained on the computational device connected to the network or on any of the plurality of the mobile communication devices connected to the ad-hoc network.

* * * * *